United States Patent [19]

Sakata

[11] Patent Number: 5,148,425
[45] Date of Patent: Sep. 15, 1992

[54] OVERSHOOT MINIMIZING TRACKING SERVO APPARATUS

[75] Inventor: Haruyasu Sakata, Tokorozawa, Japan

[73] Assignee: Pioneer Electronic Corporation, Tokyo, Japan

[21] Appl. No.: 418,870

[22] Filed: Oct. 10, 1989

[30] Foreign Application Priority Data

Oct. 11, 1988 [JP] Japan .................. 63-255385

[51] Int. Cl.⁵ .................. G11B 21/10; G11B 7/08
[52] U.S. Cl. .................. 369/44.25
[58] Field of Search ........... 369/32, 44.25, 44.28, 369/44.29, 44.35, 44.34, 54, 58, 44.36

[56] References Cited

U.S. PATENT DOCUMENTS

| | | | |
|---|---|---|---|
| 4,755,977 | 7/1988 | Abed | 369/44.28 X |
| 4,817,069 | 3/1989 | Shigemori | 369/44.28 X |
| 4,817,073 | 3/1989 | Suzuki | 369/44.28 |
| 4,876,679 | 10/1989 | Mukai | 369/44.29 |
| 4,890,273 | 12/1989 | Takeuchi et al. | 369/44.36 |
| 4,975,895 | 12/1990 | Yanagi | 369/44.29 |

*Primary Examiner*—Robert L. Richardson
*Assistant Examiner*—W. R. Young

[57] ABSTRACT

A tracking servo apparatus is disclosed which detects the change in the level of tracking error signal per unit time when the information reading spot passes a position on the track at its center in the converging period of the servo pull-in operation after a decelerating pulse has been generated and, when the amount of the detected change is over reference value, controls such that at least either one of the equalizer characteristic and the gain is changed for a predetermined period of time after the detection.

4 Claims, 6 Drawing Sheets

Fig. 3(A) GENTLE SLOPE

Fig. 3(B) STEEP SLOPE

Fig. 4

Fig. 5(A) TRACKING ERROR SIGNAL WAVEFORM INPUT TO A/D

Fig. 5(B) TRACKING DRIVE SIGNAL WAVEFORM OUTPUT OF D/A

OVERSHOOT MINIMIZING TRACKING SERVO APPARATUS

BACKGROUND OF THE INVENTION

1. Field of the Invention

The present invention relates to a tracking servo apparatus for use in a disk player.

2. Description of the Related Art

In a disk player for playing back an information record disk (hereinafter, simply referred to as "disk") such as a video disk and a digital audio disk, a tracking servo apparatus is indispensable for controlling the information reading spot of a pickup to accurately follow the record track at all times regardless of eccentricity of the disk or the like.

The tracking servo apparatus achieves the position control of the information reading spot relative to the record track by generating a tracking error signal corresponding to the amount of deviation of the information reading spot with respect to the record track of the disk in the radial direction of the disk and driving an actuator for shifting the information reading spot in the radial direction of the disk in in accordance with the tracking error signal, thus operating as a so-called closed loop controlling system. Further, such a servo apparatus, when making a so-called jump operation to allow the information reading spot to skip over some record tracks, performs controlling operations to apply an accelerating pulse to the actuator with the servo loop brought into an open state and then, at predetermined timing in the jump operation, apply a decelerating pulse to the actuator, and thereafter, at suitable timing, to execute a servo pull-in operation with the servo loop closed.

In the track jump control, since the track pitch of the disk is fixed by standards, the pulse width and pulse height of the accelerating pulse and decelerating pulse are set in accordance with the track pitch. There are, however, some nonstandard disks whose track has a large swell. At the time of playback of such a disk, if a track jump is performed at a portion of the track where it has a large deformation, the braking force produced by the decelerating pulse becomes smaller than the optimum value making it difficult for the servo apparatus to pull the information reading spot onto the target track, whereby overshoot is produced in the tracking error. Once the overshoot occurs, not only the jumping operation becomes unstable but also a continuing oscillation is produced in the subsequent playback.

SUMMARY OF THE INVENTION

Accordingly, an object of the present invention is to provide a tracking servo apparatus which, while playing back a disk having a large swell in its track, is capable, even when it executes a jump operation at a portion of the track with such a swell, of reducing the resulting overshoot to thereby achieve a stable jump operation.

In the tracking servo apparatus according to the present invention, the change in the level of the tracking error signal per unit time when the information reading spot is passing the position on the track at its center in the converging period of the servo pull-in operation after a decelerating pulse has been generated is detected, and when the amount of the detected change is over a reference value, control is performed such that at least either one of the equalizer characteristic and the gain is changed for a predetermined period of time after the detection.

BRIEF DESCRIPTION OF THE DRAWINGS

FIGS. 6, 6A and 6B is a flow chart showing controlling steps by the use of a signal processor at the time of a one-track jump.

DETAILED DESCRIPTION OF THE PREFERRED EMBODIMENT

An embodimeent of the present invention will be described below in detail with reference to the accompanying drawings.

Figure 1:
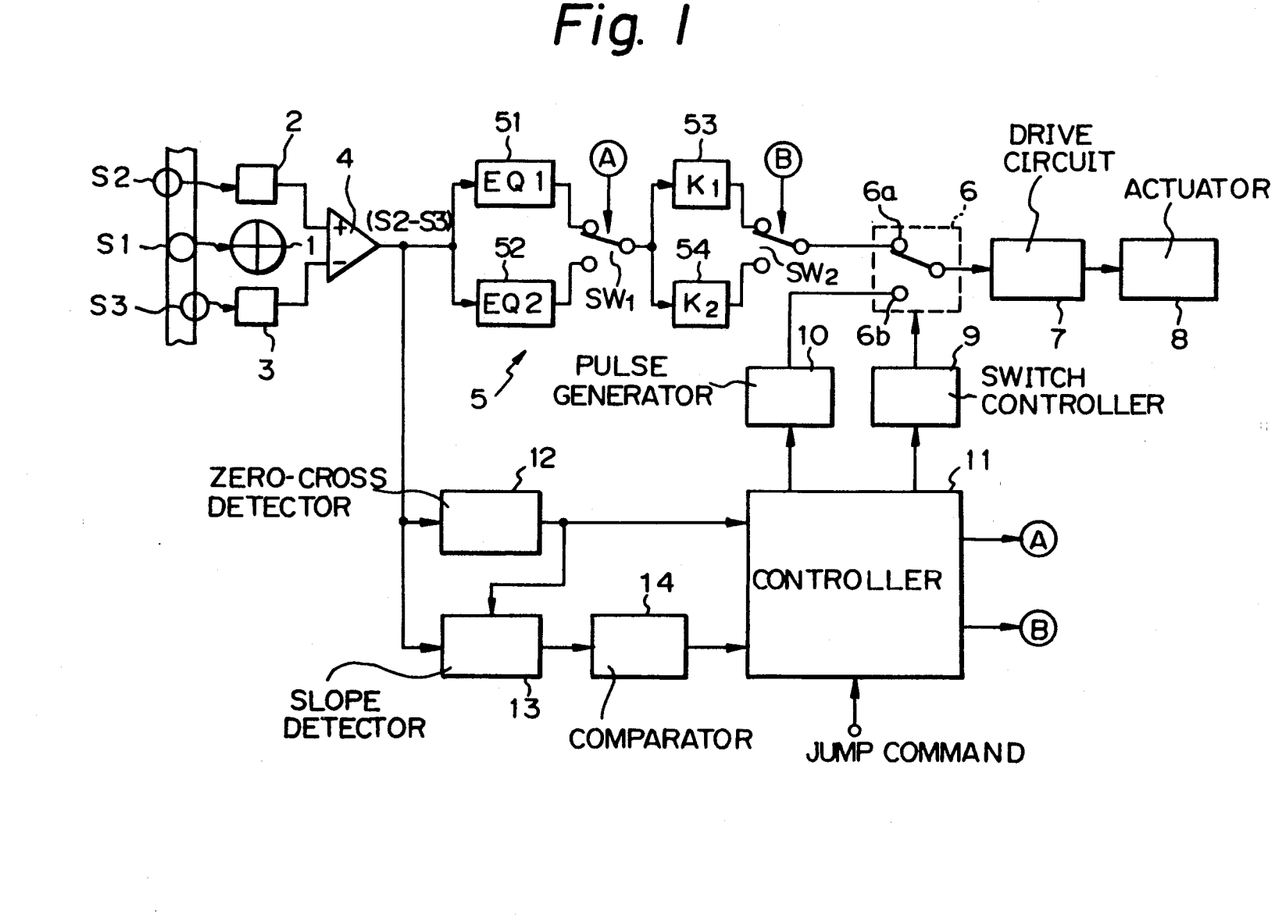
FIG. 1 is a block diagram showing an embodiment of the present invention.
Figure 2A:
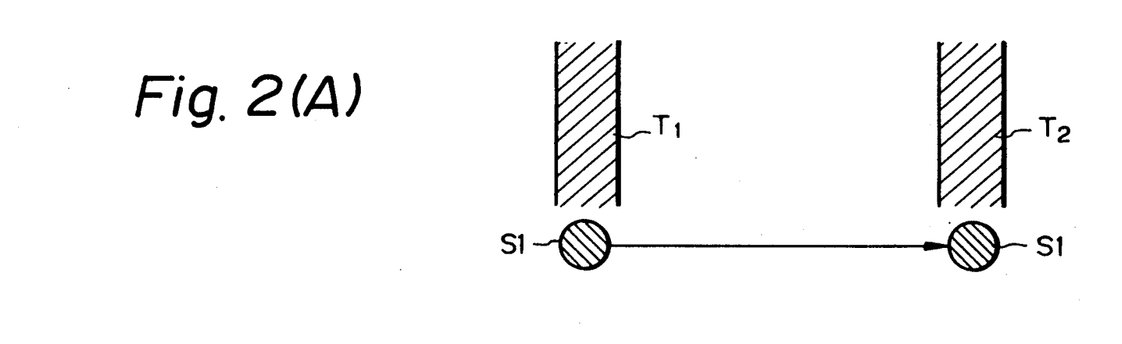
FIGS. 2A and 2B are diagrams showing the relationship between the moving position of an information reading spot with respect to the record track and a tracking error signal.
Figure 2B:
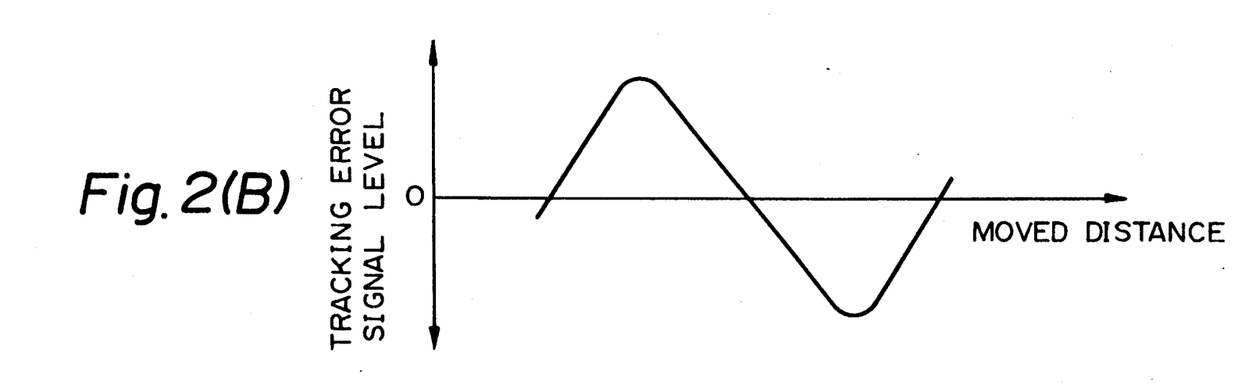

FIG. 1 is a block diagram showing an embodiment of the present invention. Referring to the figure, three beam spots obtained by converging laser beams, i.e., a record information reading spot S1 and a pair of tracking information detecting spots S2 and S3, preceding and following the spot S1 when it moves relative to a disk, are thrown by a pickup (not shown) on a record track T of the disk, the three spots being kept in the relative positions as shown. Reflected light of the beam spots is introduced into photoelectric conversion devices 1 as well as 2 and 3 incorporated in the pickup. The photoelectric conversion device 1 is arranged so as to be divided into four divisions by two perpendicularly crossing lines and it is thereby formed of four photosensing elements independent from one another. The sum total of outputs of the four photosensing elements constitute a read RF (high-frequency) signal. Meanwhile, outputs of the pair of photoelectric conversion devices 2 and 3 are supplied to a differential amplifier 4, wherein difference between the two outputs is obtained and this difference output (S2–S3) becomes a tracking error signal. When the beam spots S1 to S3 move from a record track $T_1$ to the adjoining record track $T_2$ in a jump operation as shown in FIG. 2(A), the tracking error signal (S2–S3) exhibits a sine waveform as shown in FIG. 2(B), whose level is proportional to the deviation of the information reading spot S1 from the record track T and the zero-cross points each corresponds to the position at the center of the record track T and the position in the middle between the tracks $T_1$ and $T_2$.

The tracking error signal (S2–S3) is compensated for its frequency characteristic in a signal processing circuit 5 and thereafter supplied to a close contact 6a of a loop switch 6. Output of the loop switch 6 is supplied to an actuator 8 of the pickup through a drive circuit 7. The actuator 8 shifts the information reading spot S1 in the radial direction of the disk according to the level of the tracking error signal so that the spot S1 is allowed to accurately follow the record track T. A tracking servo loop is formed in the described way.

The loop switch 6 is controlled by a switch control circuit 9 such that the loop close state is set when the switch 6 is on the side of the close contact 6a. In the loop open state where the loop switch 6 is on the side of the open contact 6b, each of an accelerating pulse and a decelerating pulse whose polarities are reverse to each other is generated from a pulse generator 10 and supplied to the actuator 8 at suitable timing, whereby a jump operation is performed. The timing at which the accelerating pulse and decelerating pulse are generated is controlled by a controller 11. At the end of the jump operation, the servo loop is put into the closed state and the servo pull-in operation is started.

The signal processing circuit 5 is made up of equalizers 51 and 52 having equalizer characteristics EQ1 and EQ2 different from each other, a selector switch $SW_1$ for selecting one of these equalizers, amplifiers 53 and 54 having gains $K_1$ and $K_2$ different from each other and a selector switch $SW_2$ selecting one of these amplifiers. While the equalizer characteristic EQ1 and gain $K_1$ are set such that suitable compensation for frequency characteristic is effected in response to the tracking error signal at the time of normal playing, the equalizer characteristic EQ2 and gain $K_2$ are set to such characteristic and gain ($K_2 > K_1$) that enhance the pull-in capability at the time of a servo pull-in operation. The switching control of the selector switches $SW_1$ and $SW_2$ is performed by the controller 11.

The tracking error signal (S2–S3) is further supplied to a zero-cross detector 12 and a slope detector 13. The zero-cross detector 12 detects, from a tracking error signal obtained during a jump operation as shown in FIG. 2(B), both a zero cross at the change of the signal from positive value to negative value occurring when the information reading spot passes the position in the middle between record tracks (off track) and a zero cross at the change thereof from negative value to positive value occurring when the spot passes the position at the center of a record track (on track). The detected outputs by the zero-cross detector 12 are supplied to both the controller 11 and the slope detector 13. The slope detector 13 as a first detection means detects a change in the level of the tracking error signal produced when the information reading spot passes the position on the record track at its center, that is, the slope of the tracking error signal waveform at the zero-cross timing and outputs slope information corresponding to the detected slope. This slope information is compared with a predetermined threshold value (reference value) in a comparator-with-threshold-value 14. The comparator-with-threshold-value 14 as a second detection means outputs a comparison output when it determines the degree of the slope to be larger than the threshold value, and this comparison output is supplied to the controller 11.

Figure 3A:
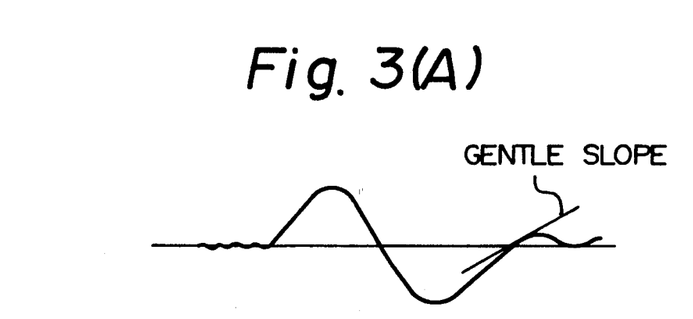
FIGS. 3A and 3B show waveform charts at the time of a one-track jump.
Figure 3B:
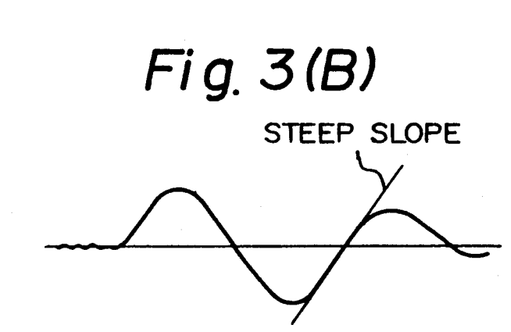

When the slope of the waveform of the tracking error signal in the vicinity of the zero cross where the information reading spot passes the position on the record track at its center is gentle as shown in FIG. 3(A), it indicates that the pull-in operation at the end of the track jump is tending to converge, namely, a stabilized jump operation is being performed, but when the slope is steep as show in FIG. 3(B), the pull-in effect is not so well exhibited and there is a high possibility of occurrence of overshoot. In other words, since the degree of the slope of the waveform of the tracking error signal around the zero cross and the speed of the information reading spot relative to the record track is virtually in a proportional relationship, it can be forecast that the overshoot will become large when the slope is steep.

The controller 11 is formed of a microcomputer. At the time of a jump operation, it, in response to a jump command from the outside and a detection output of the zero-cross detector 12, delivers a timing signal for switching the loop switch 6 to the switch controller 9 and a timing signal for generating an accelerating pulse and that for generating a decelerating pulse to the pulse generator 10. Further, the controller 11, when the comparison signal is output from the comparator-with-threshold-value 14, namely, when the degree of the slope of the waveform of the tracking error signal where the information reading spot passes the position on the record track at its center is larger than the threshold value, controls the selector switches $SW_1$ and $SW_2$ by supplying an equalizer switching signal and a gain switching signal to the selector switches $SW_1$ and $SW_2$, which are normally set to select EQ1 and $K_1$, for causing the selector switches $SW_1$ and $SW_2$ to select EQ2 and $K_2$ for, for example, a predetermined period of time, and to select EQ1 and $K_1$ again after the predetermined period of time has elapsed.

In the described manner, when the degree of the slope of the waveform of the tracking error signal at the zero-cross timing is larger, EQ2 providing a higher pull-in capability and gain $K_2$ higher than $K_1$ are selected for a predetermined period of time so that the overshoot amount can be reduced. When the degree of the slope is smaller, it indicates that the pull-in operation is tending to converge. If EQ2 and gain $K_2$ providing the higher pull-in capability are selected when the level of the error signal is low, it is possible that an oscillation occurs, and hence, the switching of the equalizer characteristic and gain is not performed.

Figure 4:
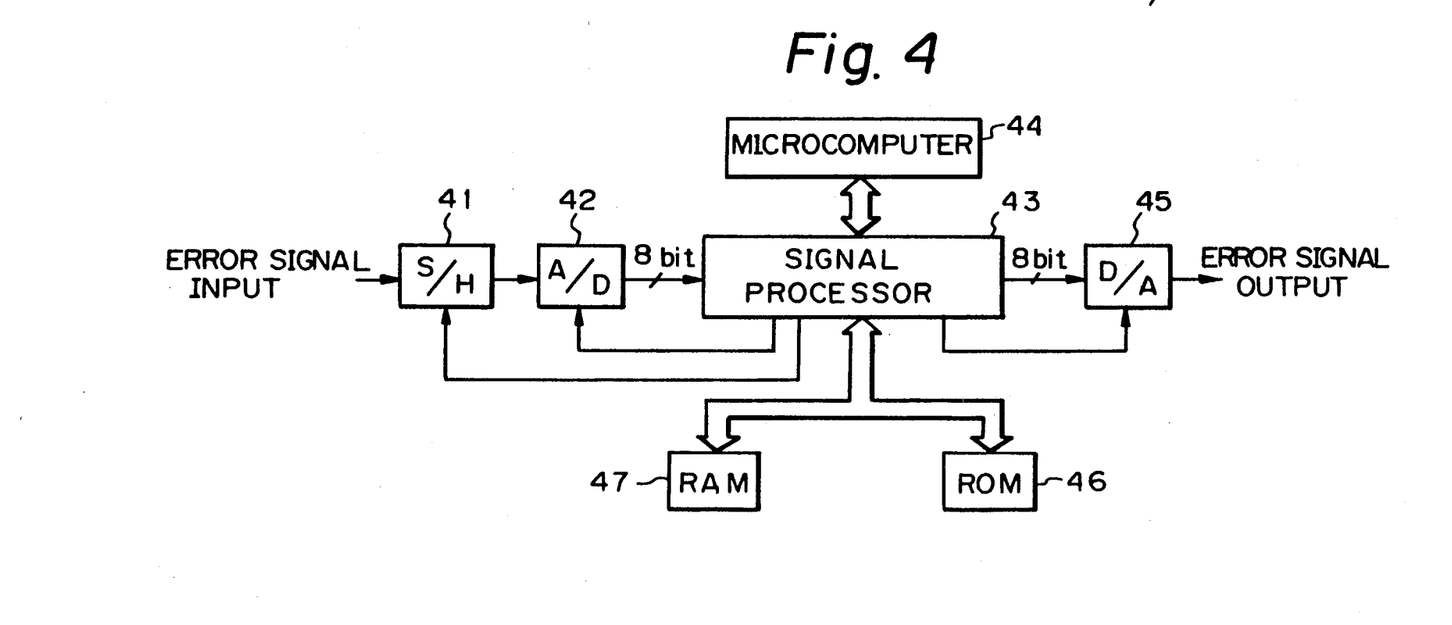
FIG. 4 is a block diagram showing an embodiment performing signal processing at the time of track jump operation by the use of a signal processor by means of software.

Although the above described embodiment has been such that signal processing is performed therein by means of hardware, it can also be arranged such that the signal processing is performed by the use of a signal processor by means of software as show in FIG. 4.

Referring to FIG. 4, input of the tracking error signal is subjected to sampling in a sample and hold circuit 41 and digitized in an A/D converter 42 to be supplied, for example, as 8-bit data to a signal processor 43. The signal processor 43 is controlled by a microcomputer 44 to perform frequency characteristic compensation for the tracking error signal and also to perform such processes, at the time of a jump operation, as generation of accelerating signal and deceleration signal, zero-cross detection of the tracking error signal, detection, at the time of zero-cross detection, of a change, per unit time (for example, one sampling period of the microcomputer), of the level of the tracking error signal (degree of the slope of the error signal waveform), comparison of the degree of the slope with a reference value, and switching control of equalizer characteristic and gain. Eight-bit data output from the signal processor 43 are converted to analog data in a D/A converter 45 and supplied as the drive input to the drive circuit 7 (shown in FIG. 1). The signal processor 43 supplies a sampling timing pulse to the sample and hold circuit 41, an A/D timing pulse to the A/D converter 42, and a D/A timing pulse to the D/A converter 45. A ROM 46 stores predetermined data in advance, and a RAM 47 temporarily stores data obtained in the course of the signal processing.

Figure 5A:
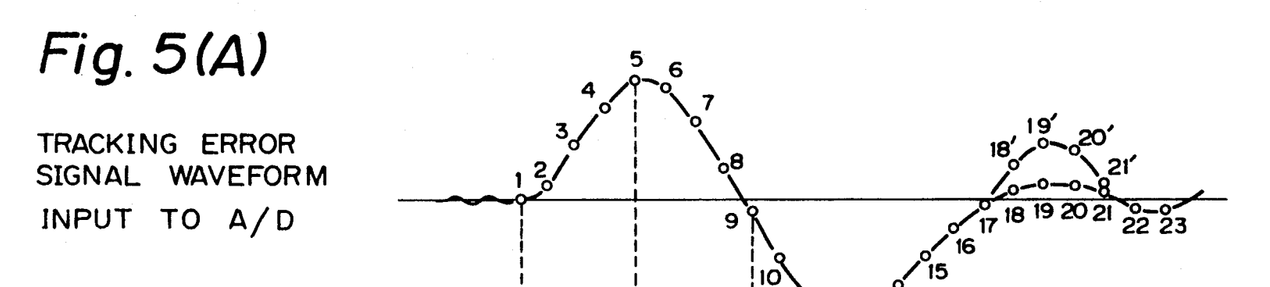
FIGS. 5A and 5B show the relationship between a tracking error signal waveform (5A) and a tracking drive waveform (5B) at the time of a one-track jump.
Figure 5B:
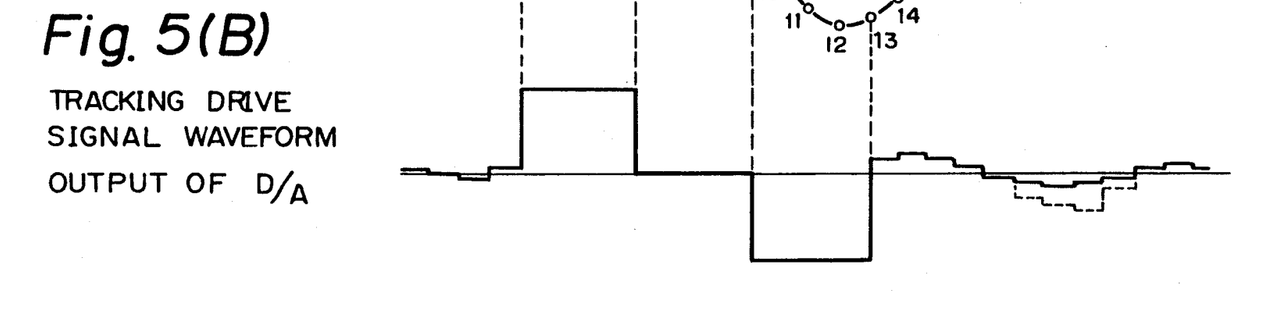
Figure 6A:
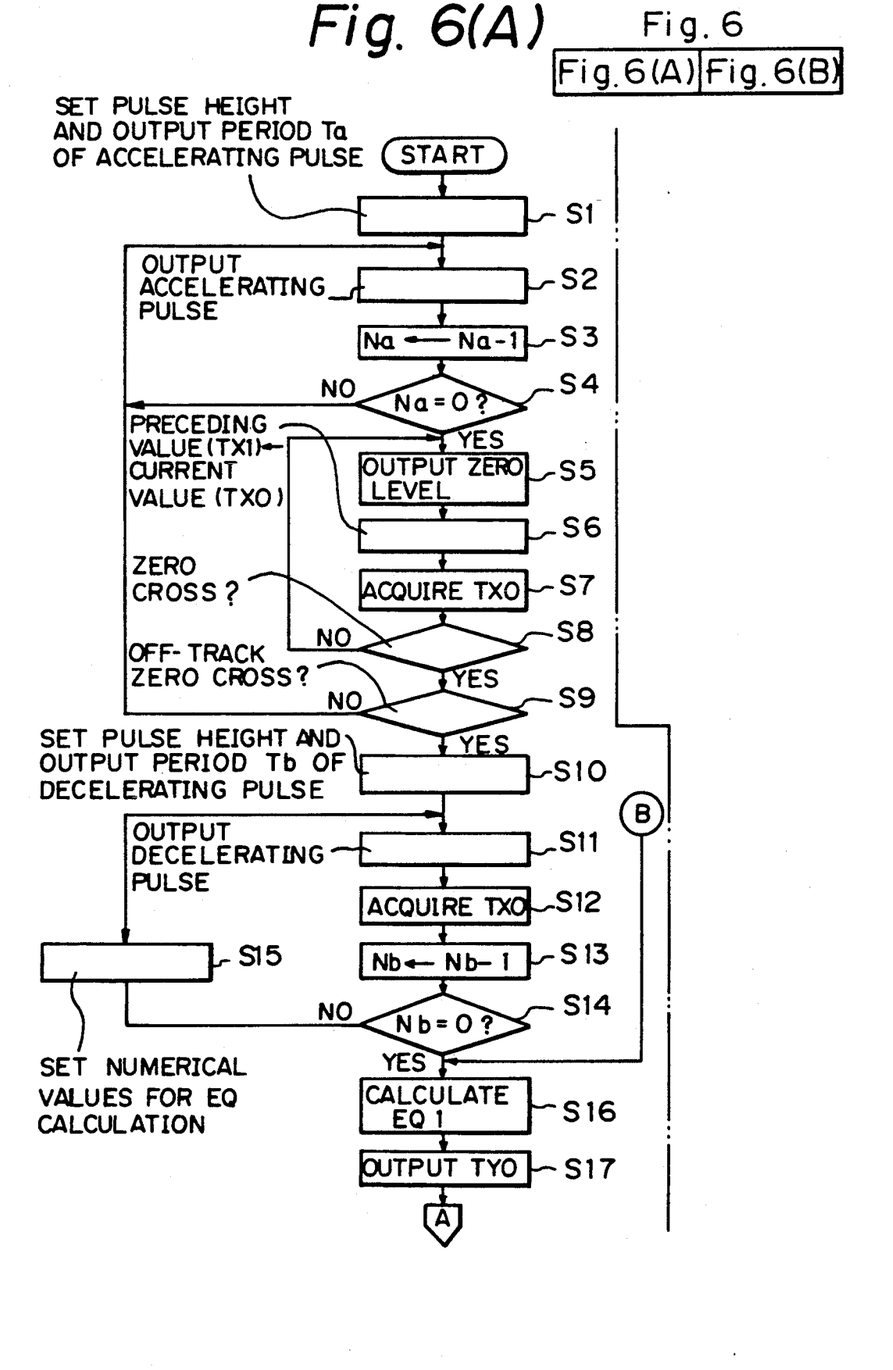
Figure 6B:
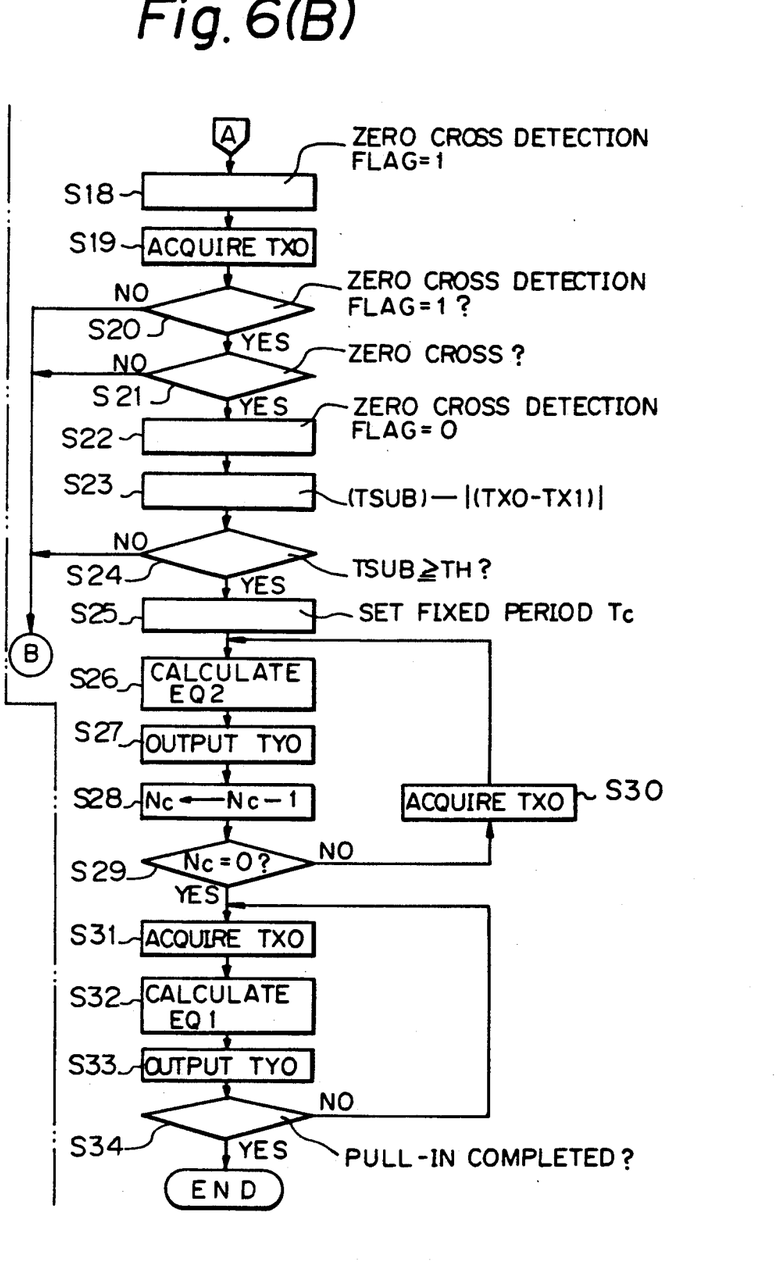

Now, steps of controlling, for example, for one track jump operation when the signal processor 43 is used will be described according to a flow chart of FIG. 6 with reference to waveform charts of FIG. 6. Referring to FIG. 5, (A) shows a tracking error signal waveform while (B) shows a tracking drive waveform, and numerals attached to the tracking error signal waveform (A) denote sampling numbers while the broken line of the tracking drive waveform (B) indicates the waveform at the time when the equalizer is changed and the gain raised.

In response to a jump command, the pulse height of an accelerating pulse is set and a value Na corresponding to its output period Ta is set in an internal time counter (step S1) and then the accelerating pulse is output (step S2). The value Na of the time counter is counted down (step S3), and in succession thereto, it is determined whether or not Na=0, namely, whether or not the output period Ta of the accelerating pulse has elapsed (step S4). If Na≠0, the flow returns to step S2 and the delivery of the accelerating pulse is kept on.

If Na=0, zero level is output (step S5), and the current value TX0 of the error data which has already been received from the A/D converter 42 is stored into the memory as the preceding value TX1 (step S6) and successively new error data is received from the A/D converter 42 as the current value TX0 (step S7). Then, it is determined whether or not zero cross of the tracking error has occurred by checking whether or not the polarity of the current value TX0 is different from that of the preceding value TX1 (step S8), and when no zero cross has been detected, the processor returns to step S5 and keeps on outputting zero level. When zero cross has been detected, then it is determined whether or not the zero cross is an off-track zero cross (step S9). When it is an on-track zero cross, the flow is returned to step S2, but when it is an off-track zero cross, the pulse height of a decelerating pulse is set and a value Nb corresponding to its output period Tb is set in the aforementioned time counter (step S10), and thereafter the decelerating pulse is output (step S11). Then, new error data is received from the A/D converter 42 as the current value TX0 to be stored (step S12).

The value Nb in the time counter is counted down (step S13), and then it is determined whether or not Nb=0, namely, whether or not the output period of the decelerating pulse Tb has elapsed (step S14). If Nb≠0, numeric values for calculating the equalizer characteristic (including the gain) are stored into an internal register (step S15), and thereafter, the processor returns to step S11 and keeps on outputting the decelerating pulse. If Nb=0, an equalizer calculation corresponding to the EQ1 and gain $K_1$ in FIG. 1 is performed (step S16), the result of the calculation is output as data TY0 to the D/A converter 45 (step S17), and then, a zero-cross detection flag is set up (step S18).

Then, new error data is received as the current value TX0 from the A/D converter 42 (step S19), and thereafter, it is checked whether or not the zero-cross flag is set (step S20). Then, the processor determines occurrence of zero cross by checking whether or not the polarity of the current value TX0 is different from that of the preceding value TX1 (step S21), and if no zero cross is detected, it returns to step S16. If zero cross is detected, the processor clears the zero-cross detection flag (step S22), and thereafter, it obtains the absolute value of the difference between the current value TX0 and the preceding value TX1, $|TX0-TX1|$, that is, the absolute value of the degree of the slope TSUB (step S23).

Subsequently, it is determined whether or not the absolute value TSUB is larger than a threshold value TH (step S24), and if TSUB<TH, the flow is returned to step S16. If TSUB≧TH, a value Nc corresponding to the period (fixed) $T_c$ during which a changed equalizer characteristic is applied is set in the aforesaid time counter (step S25), and thereafter, an equalizer calculation corresponding to the EQ2 and gain $K_2$ in FIG. 1 is performed (step S26), and the result of the calculation is output as data TY0 to the D/A converter 45 (step S27). In succession thereto, the time counter Nc for the time Tc is counted down (step S28), and thereupon, it is determined whether or not Nc=0, namely, whether or not the fixed period Tc has elapsed (step S29). If Nc≠0, new error data is received from the A/D converter 42 as the current value TX0 (step S30), and thereafter, the processor returns to step S26 and performs an equalizer calculation corresponding to the EQ2 and gain $K_2$ for the error data TX0.

If Nc=0, the processor receives new error data as the current value TX0 from the A/D converter 42 (step S31), and performs an equalizer calculation corresponding to the EQ1 and gain $K_1$ for the error data TX0 (step S32) and supplies the calculation result as error data TY0 to the D/A converter 45 (Step S33). The equalizer calculation is repeated until it is determined that the pull-in operation has been completed at step S34.

Although, zero cross was detected only once and the equalizer characteristic and gain were changed only for a predetermined period after the time of the detection in the above described embodiment, the characteristics may be changed until next zero cross is detected, or the above operations may be repeated until the degree of the slope at zero cross becomes smaller than the threshold value.

Although both the equalizer characteristic and the gain were simultaneously changed in the above described embodiment, a satisfactory effect can be obtained even by arranging such that only the equalizer characteristic or the gain is changed.

Although, in the above described embodiment, the change in the level of the tracking error signal was arranged to be detected at an interval of one sampling period of the microcomputer, the interval may of course be an integer multiple of the period.

In the tracking servo apparatus as described above, it is made possible to reduce the quantity of overshoot by changing at least either one of the equalizer characteristic and the gain in the case where the change in the level of the tracking error signal per unit time when the information reading spot is passing on the track is over a reference value in the converging period of the servo pull-in operation after a decelerating pulse has been generated, and it is enabled to prevent the oscillation from occurring by using the normal equalizer characteristic and gain when the pull-in operation is tending to converge. Therefore, even when playing back a disk having a track with a swell, a stabilized jump operation can be achieved.

What is claimed is:

1. A tracking servo apparatus having error signal generating means for generating a tracking error signal corresponding to a deviation of an information reading spot with respect to the record track of an information recording disk in the radial direction of the disk, signal processing means with a predetermined equalizer characteristic and gain for processing said tracking error signal, pulse generating means for generating an accelerating pulse responding to a jump command and generating a decelerating pulse at a predetermined timing in a track jump operation, and drive means for shifting said information reading spot in the radial direction of the disk responding to said tracking error signal passed through said signal processing means or said accelerating pulse and decelerating pulse, further comprising:

first detection means for detecting an amount of change per unit time in the level of said tracking error signal when said information reading spot passes a position on said record track at its center after said decelerating pulse has been generated;

second detection means for detecting that said amount of change exceeds a reference value; and control means for changing at least one of said equalizer characteristic and gain for a predetermined period from the detection by said second detection means.

2. A tracking servo apparatus according to claim 1, wherein said predetermined period is a fixed period.

3. A tracking servo apparatus according to claim 1, wherein said predetermined period is a period lasting until said information reading spot passes a position in the middle of record tracks.

4. A tracking servo apparatus according to claim 3, including means for detecting that said information reading spot has reached a central position between said record tracks based on the level of said tracking signal.

* * * * *